US011643907B2

(12) United States Patent
Sims et al.

(10) Patent No.: US 11,643,907 B2
(45) Date of Patent: May 9, 2023

(54) BALL-TYPE DOWNHOLE VALVE (71) Applicant: INNOVEX DOWNHOLE SOLUTIONS, INC., Houston, TX (US)

(72) Inventors: Bryan Sims, Houston, TX (US); Jeffery Kitzman, Houston, TX (US); Jason Voss, Houston, TX (US); Brent Driller, Houston, TX (US)

( * ) Notice: Subject to any disclaimer, the term of this patent is extended or adjusted under 35 U.S.C. 154(b) by 133 days.

(21) Appl. No.: 16/995,071

(22) Filed: Aug. 17, 2020

(65) Prior Publication Data
US 2022/0049579 A1 Feb. 17, 2022

(51) Int. Cl.
*E21B 34/14* (2006.01)
*F16K 27/02* (2006.01)
*F16K 15/04* (2006.01)

(52) U.S. Cl.
CPC ............ *E21B 34/142* (2020.05); *F16K 15/04* (2013.01); *F16K 27/0209* (2013.01); *E21B 2200/04* (2020.05)

(58) Field of Classification Search
CPC .... E21B 34/142; E21B 2200/04; F16K 15/04; F16K 27/0209
See application file for complete search history.

(56) References Cited

U.S. PATENT DOCUMENTS 4,263,936 A * 4/1981 Brown .................... F16K 15/04
  137/496
4,694,855 A * 9/1987 Cunningham .......... E21B 34/08
  137/519.5
8,813,849 B1 * 8/2014 Davis ..................... E21B 34/08
  166/329
9,371,708 B2 * 6/2016 Weir ..................... E21B 33/068
2012/0312548 A1 * 12/2012 Swist ..................... E21B 21/10
  166/373
2018/0230750 A1 * 8/2018 Lorenson ............ E21B 21/103

FOREIGN PATENT DOCUMENTS

| CN | 2510620 Y | 9/2002 |
| CN | 2554343 Y | 6/2003 |
| WO | 2014/055191 A1 | 4/2014 |

OTHER PUBLICATIONS

Seung Hoon Bahng (Authorized Officer), International Search Repod and Written Opinion dated Dec. 6, 2021, PCT Application No. PCT/US2021/046089, 11 pages.

* cited by examiner

*Primary Examiner* — Christopher J Sebesta
(74) *Attorney, Agent, or Firm* — MH2 Technology Law Group LLP (57) ABSTRACT A downhole valve includes a housing, and a sleeve positioned within the housing. The sleeve has a first axial end, a second axial end, and a seat positioned between the first and second ends. The sleeve defines an opening facing in a radial direction. The sleeve prevents fluid flow in an opposite radial direction, away from the opening. The valve also includes a retaining element coupled to or integral with the sleeve, and a first obstructing member positioned in the sleeve and movable between the seat and the retaining element. In a first position, the first obstructing member engages the seat and prevents fluid flow through the housing. In a second position, the first obstructing member is separated apart from the seat such that at least a portion of the opening is axially between the first obstructing member and the first obstructing member.

23 Claims, 5 Drawing Sheets

BALL-TYPE DOWNHOLE VALVE

BACKGROUND

In oil and gas wells, tubular strings such as casing string, liner strings, etc., are run into a well and may be cemented in place to support production. Further, other types of tubular strings may be run into the well, e.g., through the cemented strings, e.g., to perform operations within the well. In various applications, either such type of string may include a one-way check valve, often referred to as a "backpressure" valve. Backpressure valves allow circulation of fluid, cement, etc., in one direction, generally a downhole direction, through the string, but prevent reverse fluid flow, e.g., back up through the string to the surface.

In some cases, it may be desirable to position the backpressure valve uphole of another, subjacent downhole tool of the string. The subjacent tool may be actuatable, e.g., to direct pressure to a particular location in the well. The backpressure valve may, however, make mechanical actuation of the subjacent tool difficult, as the valve element of the backpressure valve may restrict access to the subjacent tool from the surface.

SUMMARY

Embodiments of the disclosure provide a downhole valve including a housing, and a sleeve positioned within the housing. The sleeve has a first axial end, a second axial end, and a seat positioned between the first axial end and the second axial end, and the sleeve defines an opening between the first and second axial ends, the opening facing in a radial direction and the sleeve preventing fluid flow in an opposite radial direction away from the opening. The valve also includes a retaining element coupled to or integral with the sleeve proximal to the second axial end, and a first obstructing member positioned in the sleeve and movable between the seat and the retaining element. In a first position, the first obstructing member engages the seat and prevents fluid flow through the housing, and in a second position, the first obstructing member is separated apart from the seat such that at least a portion of the opening is axially between the first obstructing member and the first obstructing member.

Embodiments of the disclosure also provide a method for operating a downhole valve. The method includes positioning a first obstructing member in a sleeve that has a first axial end, a second axial end, a valve seat between the first and second axial ends, and an opening between the second axial end and the valve seat. The first obstructing member is retained within the sleeve by the valve seat and a retaining member that is coupled to or integral with the sleeve and positioned proximal to the second axial end, and the sleeve is positioned within a housing of the downhole valve. The method also includes deploying the downhole valve into a well. The first obstructing member is configured to engage the valve seat to prevent fluid communication in an uphole direction, and the first obstructing member is configured to move away from the valve seat to permit fluid communication in a downhole direction. The method further includes deploying a second obstructing member into the well. The second obstructing member proceeds into the sleeve, past the first obstructing member and through the opening, and to a downhole tool positioned subjacent to the downhole valve, to actuate the downhole tool.

Embodiments of the disclosure further provide a downhole valve that includes a housing and a sleeve positioned within the housing. The sleeve has a first axial end, a second axial end, and a seat positioned between the first axial end and the second axial end. The sleeve defines a slot extending from the second axial end, and the sleeve is continuous in a circumferential direction as proceeding from one side of the slot to an opposite side of the slot, such that the slot faces in a radial direction and the sleeve prevents fluid flow in an opposite radial direction away from the slot. The valve also includes a retaining element coupled to the sleeve proximal to the second axial end, and a first obstructing member positioned in the sleeve and movable between the seat and the retaining element. In a first position, the first obstructing member engages the seat and prevents fluid flow through the housing, and in a second position, the first obstructing member is separated apart from the seat such that at least a portion of the slot is axially between the first obstructing member and the first obstructing member. The first obstructing member is too large to fit through the slot. The valve also includes a second obstructing member that is smaller than the first obstructing member, such that the second obstructing member is configured to move out of the sleeve via the slot when the first obstructing member is in the second position.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1:
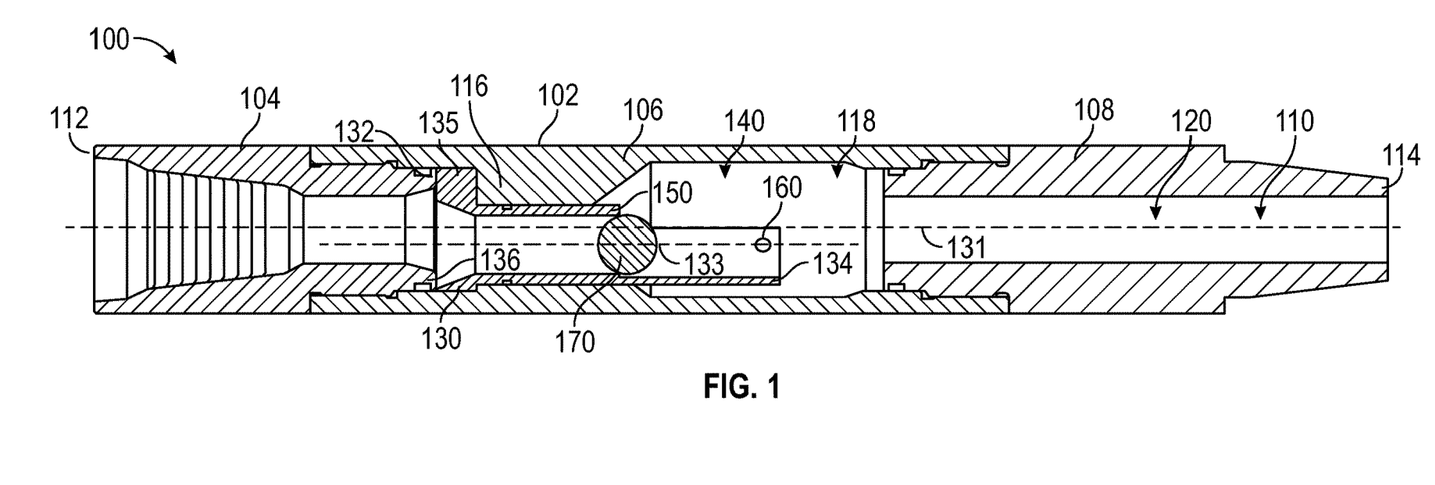
FIG. 1 illustrates a side, sectional view of a downhole valve having a first obstructing member in a first position, according to an embodiment.

FIG. 1 illustrates a side, cross-sectional view of a downhole valve 100, according to an embodiment. The downhole valve 100 may be, for example, a backpressure valve, which may be used, e.g., as part of a liner hanging assembly, coiled tubing, or another type of assembly, e.g., for cementing operations, treatment operations, or the like. The downhole valve 100 may generally operate as a one-way valve, as will be described herein, allowing pressure communication (e.g., fluid flow) in one direction (e.g., downhole), while preventing pressure communication in the opposite direction (e.g., uphole). Further, the downhole valve 100 may be configured to permit passage of one or more obstructing members therethrough, which may be configured to actuate one or more downhole tools that are subjacent to (positioned downhole of) the valve 100.

The valve 100 may include a housing 102. The housing 102 may be monolithic or made of several different components that are connected together. For example, as illustrated, the housing 102 includes an upper sub 104, a middle sub 106, and a lower sub 108. The subs 104-108 may be threaded and sealed together, e.g., to collectively form a through-bore 110 therein. The through-bore 110 may extend from a first, uphole end 112 of the housing 102 to a second, downhole end 114 of the housing 102. Unless otherwise obstructed, fluid communication may be permitted via the through-bore 110 through the valve 100. In at least one embodiment, the upper sub 104, forming the uphole end 112, may include female threads (e.g., a box end), while the lower sub 108, forming the downhole end 114, may include male threads (e.g., a pin end). As such, the valve 100 may be connected to one or more tubulars on either axial end thereof, so as to form a part of a larger assembly.

The through-bore 110 may be generally cylindrical on the outside, but may not be of uniform inner diameter. For example, the through-bore 110 may have a throat 116, formed by an inwardly-protruding shoulder. Next to the throat 116 may be a radially-larger section that forms an enlarged chamber 118, as will be described in greater detail below. A smaller (compared to the chamber 118) lower bore 120 may extend from the chamber 118 to the downhole end 114 of the housing 102.

A sleeve 130 may be positioned in the housing 102 and, in some embodiments, at least partially eccentrically disposed therein. For example, at least a portion of the sleeve 130 may be cylindrical, defining a central longitudinal axis 131 therethrough. The housing 102 may likewise be generally cylindrical, at least on the outside, as noted above, and thus may also define a central longitudinal axis 133. The sleeve 130 may be positioned in the housing 102 such that the central longitudinal axes 131, 133 are offset from one either, e.g., generally parallel, but not collinear.

Further, the sleeve 130 may include a first axial end 132 and a second axial end 134. The first axial end 132 may include a shoulder 135, which may be concentrically disposed within the housing 102 and thus eccentric to the portion of the sleeve 130 defining the central longitudinal axis 133. The shoulder 135 may further be entrained axially between the upper sub 104 and the middle sub 106, specifically between an end 136 of the upper sub 104 and the throat 116. Further, the throat 116 may engage an outer surface of the sleeve 130 along at least a portion of the length of the sleeve 130.

The second axial end 134 of the sleeve 130 may be positioned in the enlarged chamber 118 of the housing 102. For example, the sleeve 130 may extend past the throat 116 and into the chamber 118.

The sleeve 130 may define an opening 140 proximal to the second end 134. The opening 140 may communicate with the enlarged chamber 118. Further, the opening 140 may be radially oriented, i.e., generally perpendicular to the central longitudinal axis 131 of the sleeve 130. In a specific embodiment, the opening 140 may be a slot that is cut into or otherwise formed in the sleeve 130, extending generally axially from the second axial end 134. As mentioned above, the sleeve 130 may be eccentric with respect to the housing 102, and in particular, the sleeve 130 may be offset with respect to the housing 102 so as to increase a distance between the radially-oriented opening 140 and the through-bore 110 of the housing 102 in the enlarged chamber 118. The sleeve 130, opposite to the opening 140, may be solid, so as to prevent fluid flow in a direction radially opposed to and away from the opening 140. As such, fluid flow in a downhole direction may generally be prevented from flowing radially away from the opening 140 within the sleeve 130. As a result, the downhole fluid flow may be directed radially outward through the opening 140.

The sleeve 130 may further include a valve seat 150 therein. The valve seat 150 may be defined by a transition from a smaller diameter section of the sleeve 130 to a larger diameter section thereof, as shown. Further, the valve seat 150 may be positioned axially between the first and second axial ends 132, 134 of the sleeve 130, e.g., within the sleeve 130. The opening 140 may be positioned axially between the valve seat 150 and the second axial end 134.

A retaining element 160 may be coupled to or formed integrally as a part of the sleeve 130. The retaining element 160 may be positioned proximal to the second axial end 134. The retaining element 160 may be, for example, a bar, bolt, dowel, or another cylindrical member. In other embodiments, the retaining element 160 may be a perforated plate.

The valve 100 further includes a first obstructing member 170 positioned in the sleeve 130 and within the housing 102. The first obstructing member 170 may be a spherical ball, as shown, but may have other forms/shapes (e.g., conical, cylindrical, etc.). The first obstructing member 170 may be movable within the sleeve 130. For example, the first obstructing member 170 may have a first position, as shown, in which the first obstructing member 170 engages the valve seat 150. The first obstructing member 170 may be sized and shaped so as to form a seal with the valve seat 150. Upward flow of fluid may force the first obstructing member 170 into the first position, and engagement with the valve seat 150 may prevent further communication of pressure upward through the housing 102.

Figure 2:
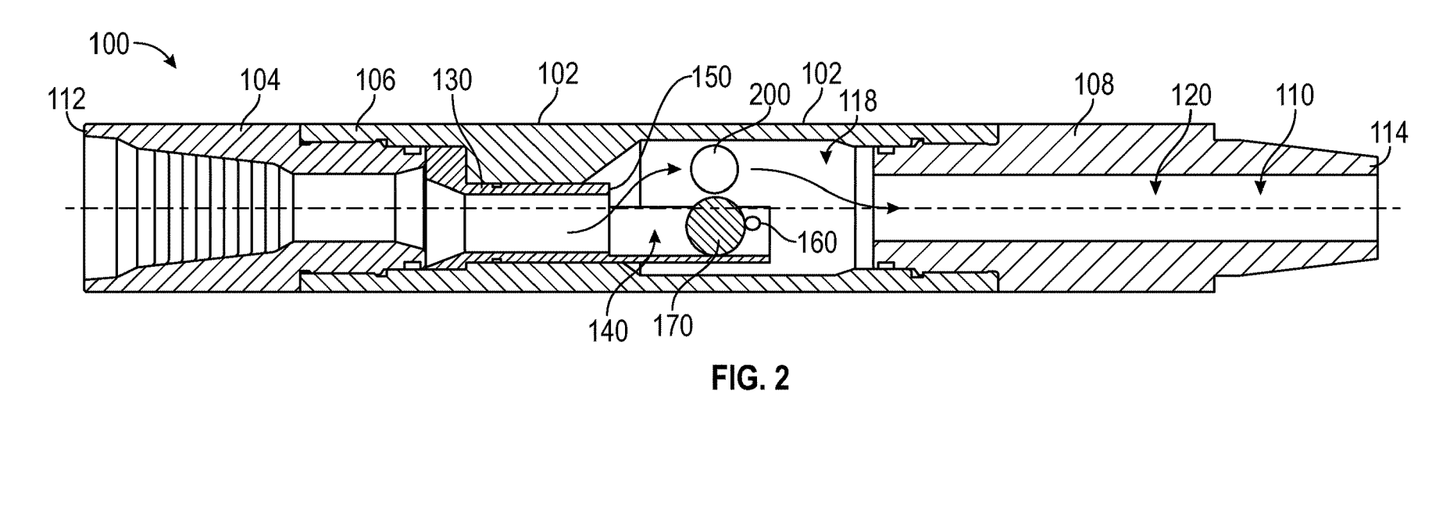
FIG. 2 illustrates a side, sectional view of the downhole valve having the first obstructing member in a second position and a second obstructing member passing thereby, according to an embodiment.

As shown in FIG. 2, the first obstructing member 170 may also have a second position that is separated axially apart from the first position, such that the opening 140 is at least partially axially between the valve seat 150 and the first obstructing member 170. For example, the first obstructing member 170 in the second position may engage the retaining element 160. The retaining element 160 may thus prevent the first obstructing member 170 from exiting out of the sleeve 130 via the second axial end 134, while potentially allowing fluid flow past the first obstructing member 170 and through the second axial end 134. Furthermore, the first obstructing member 170 and the opening 140 may be relatively sized such that the opening 140 does not permit the first obstructing member 170 to exit radially from the sleeve 130. For example, in an embodiment in which the first obstructing member 170 is a spherical ball and the opening 140 is a slot, the slot may not be as wide as the diameter of the first obstructing member 170, thereby preventing its passage through the opening 140. Accordingly, the first obstructing member 170 may be entrained within the sleeve 130, and permitted to move between the valve seat 150 and the retaining element 160.

As also shown in FIG. 2, during operation of the valve 100, a second obstructing member 200 may be deployed through the valve 100 to actuate a valve, sleeve, or another tool subjacent to the valve 100. The second obstructing member 200 may be a spherical ball, although other shapes may be employed, and may be slightly smaller than the first obstructing member 170. As such, the second obstructing member 200 may fit through the smaller diameter section of the sleeve 130, and past the valve seat 150. Further, the smaller, second obstructing member 200 may fit through the opening 140, which serves to restrain the first obstructing member 170 within the sleeve 130.

The second obstructing member 200 may thus be permitted to move radially outward from the sleeve 130 via the opening 140, propelled by the fluid flow that is directed radially through the opening 140, as discussed above. The second obstructing member 200 may then enter into the enlarged chamber 118. In some embodiments, a ramp or another structure may be provided in the sleeve 130 to direct fluid flow and movement of the second obstructing member 200 in the radial direction, toward the opening 140. In other embodiments, the provision of the opening 140, the solid wall of the sleeve 130 opposite to the opening 140, and the first obstructing member 170 blocking the second axial end 134 of the sleeve 130, may result in sufficient fluid flow through the opening 140 to cause the second obstructing member 200 to move radially outward and around the first obstructing member 170.

In the enlarged chamber 118, the second obstructing member 200 may then pass axially by the first obstructing member 170. The sizing of the first obstructing member 170, the second obstructing member 200, and the enlarged chamber 118, as well as the eccentric positioning of the sleeve 130 in the housing 102, as mentioned above, may provide the radial space necessary to permit this passage. Once past the first obstructing member 170 and the second end 134 of the sleeve 130, the second obstructing member 200 may proceed through the lower bore 120 and out of the downhole end 114 of the housing 102 for reception into a subjacent downhole tool, e.g., via one or more other tubulars, tools, etc.

Figure 3:
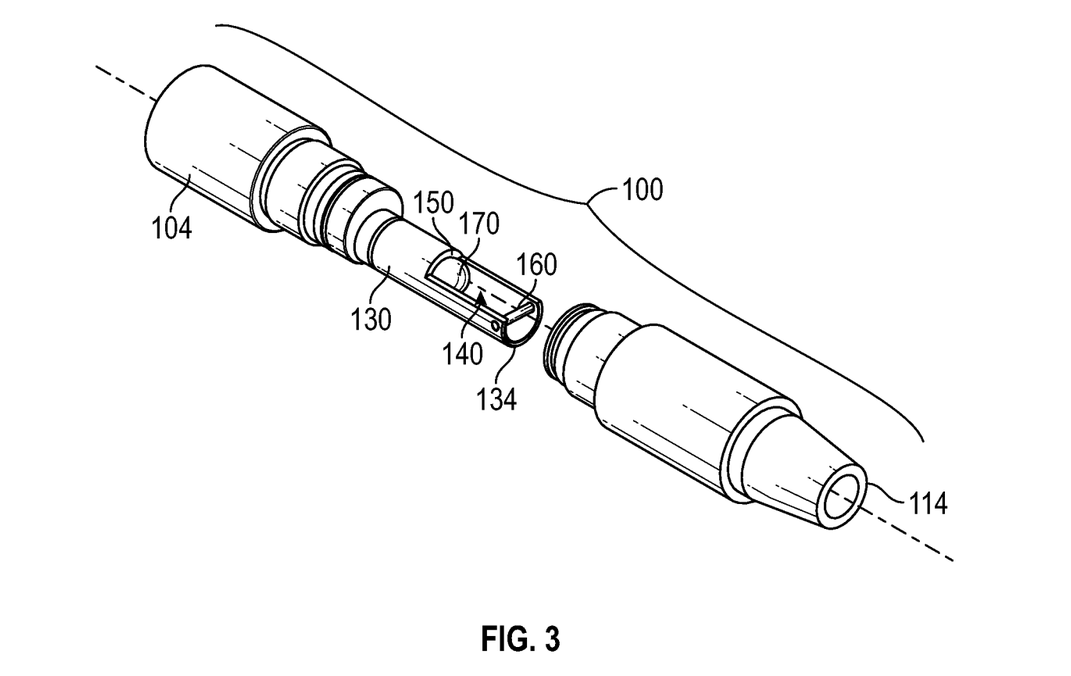
FIG. 3 illustrates a perspective view of the downhole valve showing the first obstructing member in the first position, according to an embodiment.
Figure 4:
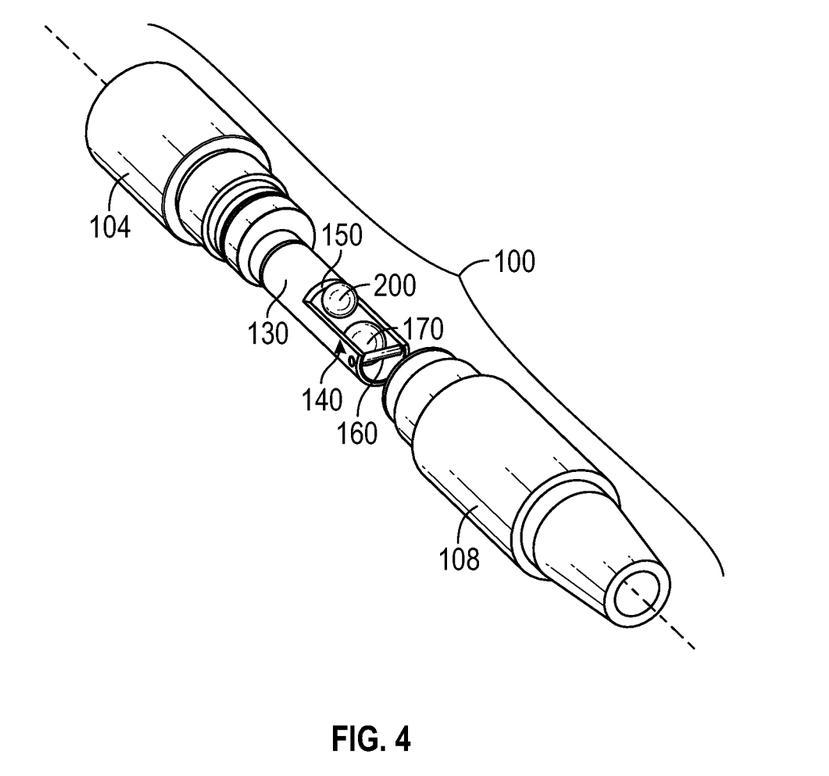
FIG. 4 illustrates a perspective view of the downhole valve showing the first obstructing member in the second position and the second obstructing member passing thereby, according to an embodiment.

FIG. 3 illustrates a perspective view of the valve 100 with the middle sub 106 omitted to facilitate viewing of the first obstructing member 170 and the sleeve 130. FIG. 4 illustrates a similar view, but additionally shows the second obstructing member 200. As shown in FIG. 3, the first obstructing member 170 in the first position engages the valve seat 150 and blocks the sleeve 130, thereby preventing uphole-directed pressure communication. As shown in FIG. 4, with the first obstructing member 170 in the second position, the retaining element 160 engages the first obstructing member 170 and prevents it from exiting from within the sleeve 130 via the second axial end 134. Further, the retaining element 160 permits downhole directed fluid flow, and, further, downhole fluid flow is also permitted through the opening 140.

Deployment of the second obstructing member 200 generally includes downward fluid flow, e.g., to cause the second obstructing member 200 to move through the well in the downhole direction. Thus, when the second obstructing member 200 reaches the valve 100, the first obstructing member 170 is in the second position, as illustrated in FIG. 4. The first obstructing member 170 in the second position exposes enough of the opening 140 to permit the second obstructing member 200 to move radially outward through the opening 140, then axially past the first obstructing member 170, and then through the rest of the housing 102.

In an embodiment, the opening 140 may extend through an arc of less than about 179, 175, 170, or 160 degrees of the sleeve 130. The inner diameter of this portion of the sleeve 130 may be slightly larger than the outer diameter of the first obstructing member 170, and thus the opening 140 extending through an arc spanning less than 180 degrees may result in a chord length (width) of the opening 140 that is less than the outer diameter of the first obstructing member, thereby preventing the first obstructing member 170 from moving through the opening 140. Furthermore, the sleeve 130 may be continuous and solid across the remainder of its circumference, thereby prevent fluid from flowing in a direction that is radially away or opposite to the opening 140. As such, the sleeve 130, in combination with the first obstructing member 170, may direct downhole-directed fluid flow outward, through the opening 140, which may promote passage of the second obstructing member 200 through the opening 140.

Figure 5:
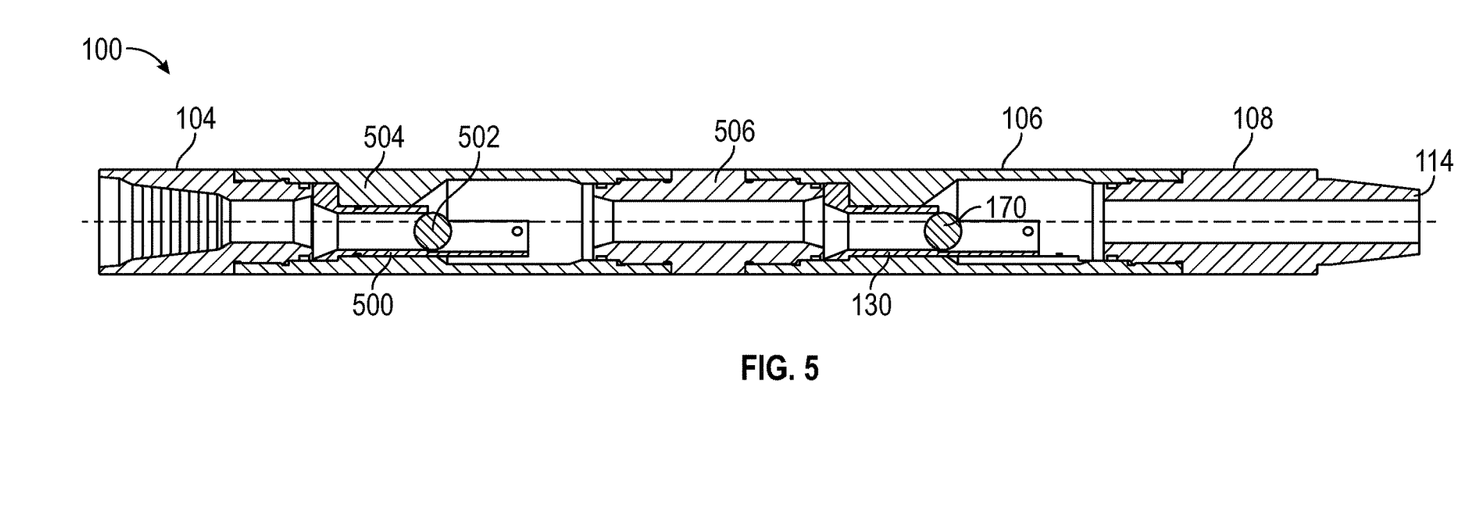
FIG. 5 illustrates a side, sectional view of another embodiment of the downhole valve.

In some embodiments, the valve 100 may include two or more sleeves and entrained obstructing members. FIG. 5 illustrates an example of the valve 100 that includes the sleeve 130 and the first obstructing member 170, as well as a second sleeve 500 and a third obstructing member 502. The second sleeve 500 and third obstructing member 502 may be structured and configured to operate in much the same way as the sleeve 130 and first obstructing member 170, and may thus be configured to provide redundancy for blocking uphole directed pressure/fluid flow, while permitting the downhole fluid flow and the second obstructing member 200 to move past the first obstructing member 170 and the third obstructing member 502 (and potentially one or more subsequent obstructing members sized and configured similar to the second obstructing member 200). In one embodiment, the first obstructing member 170 and the third obstructing member 502 are the same size. In another embodiment, the first obstructing member 170 and the third obstructing member 502 are a different size. In either example, the opening in each sleeve 130, 500 may limit the movement of the respective obstructing member 170, 502.

In this embodiment, the housing 102 may also be increased in size. For example, a second middle sub 504 may be provided, which may be similar in structure and function to the middle sub 106. Further, the middle sub 504 may connect to the upper sub 104 and to a connector sub 506. The middle sub 106 of the housing 102 may then be connected to the connector sub 506, such that the connector sub 506 and the middle sub 504 are between the middle sub 106 and the upper sub 104, as shown.

Figure 6:
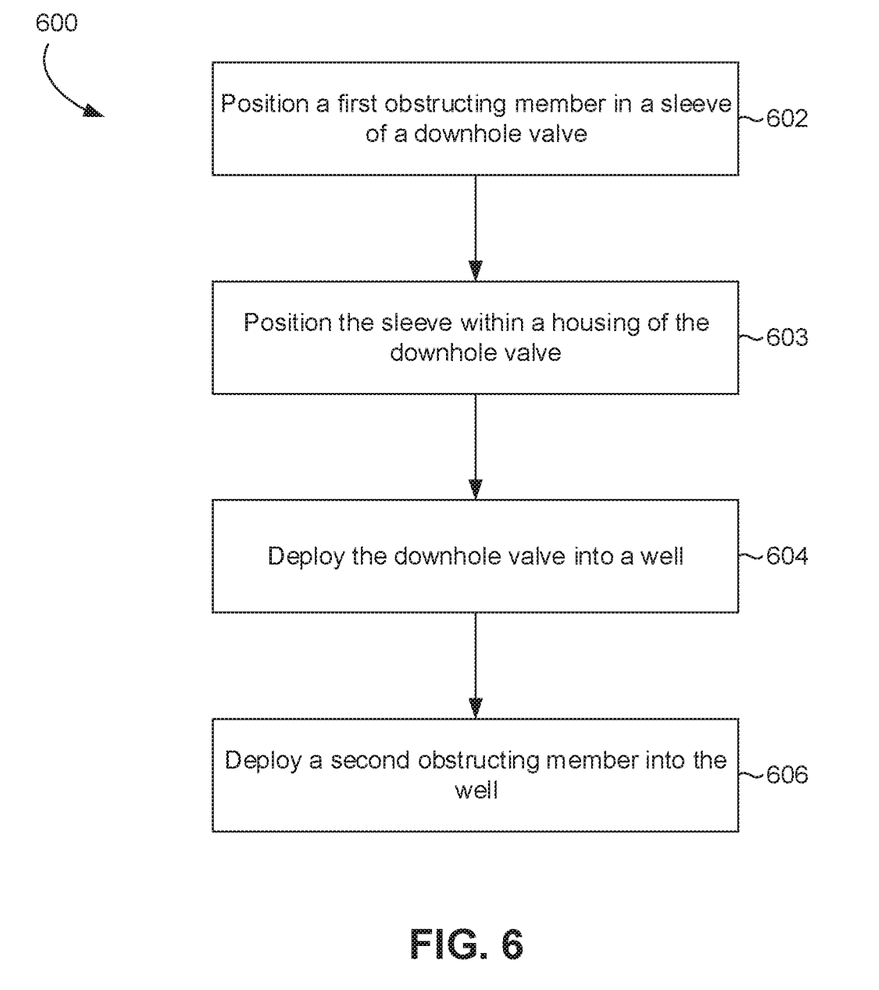
FIG. 6 illustrates a flowchart of a method for operating a downhole valve, according to an embodiment.

FIG. 6 illustrates a flowchart of a method 600 for operating a downhole valve, such as, for example, the downhole valve 100, according to an embodiment. The method 600 may include positioning a first obstructing member 170 in a sleeve 130, as at 602. The sleeve 130, in turn, may be positioned within a housing 102 of the valve 100, as at 603. As described above, the sleeve 130 may include a first axial end 132, a second axial end 134, a valve seat 150 between the first and second axial ends 132, 134, and an opening 140 between the second axial end 132 and the valve seat 150. The first obstructing member 170 is retained within the sleeve 130 by the valve seat 150 and a retaining element 160 that is coupled to the sleeve 130 proximal to the second axial end 134.

The method 600 may further include deploying the downhole valve 100 into a well, as at 604. The first obstructing member 170 engages the valve seat 150 to prevent pressure communication in an uphole direction, and is configured to move away from the valve seat 150 to permit pressure communication in a downhole direction.

Further, the method 600 includes deploying a second obstructing member 200 into the well, as at 606. For example, this may include pumping a fluid into the well, after positioning the valve 100 in the well at 604, so as to propel the second obstructing member 200 in the downhole direction, through the well and toward the downhole valve 100. The second obstructing member 200 may then proceed into the sleeve 130, past the first obstructing member 170 and through the opening 140, and to a downhole tool positioned subjacent to the downhole valve.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A downhole valve, comprising:
   a housing;
   a sleeve positioned within the housing, wherein the sleeve has a first axial end, a second axial end, and a seat positioned between the first axial end and the second axial end, and wherein the sleeve defines an opening between the first and second axial ends, the opening facing in a radial direction and the sleeve preventing fluid flow in an opposite radial direction away from the opening;
   a retaining element coupled to or integral with the sleeve proximal to the second axial end; and
   a first obstructing member positioned in the sleeve and movable between the seat and the retaining element, wherein, in a first position, the first obstructing member engages the seat and prevents fluid flow through the housing, and in a second position, the first obstructing member is separated apart from the seat such that at least a portion of the opening is axially between the first obstructing member and the seat, such that fluid flow is permitted through the opening
   wherein the first obstructing member moves axially, but is free from substantial radial movement, between the first and second positions.

2. The downhole valve of claim 1, wherein the opening is a slot that extends from the second axial end, and wherein the first obstructing member is too large to fit through the slot.

3. The downhole valve of claim 1, further comprising a second obstructing member that is smaller than the first obstructing member, such that the second obstructing member is configured to move out of the sleeve via the opening when the first obstructing member is in the second position.

4. The downhole valve of claim 1, wherein the housing defines:
   a throat that engages an outer surface of the sleeve; and
   an enlarged chamber in which the second axial end of the sleeve is positioned.

5. The downhole valve of claim 4, wherein the opening faces radially into the enlarged chamber.

6. The downhole valve of claim 4, further comprising a second obstructing member that is smaller than the first obstructing member such that the first obstructing member is configured to fit through the opening in the sleeve, wherein the second obstructing member is configured to move axially into the sleeve from outside of the housing, axially at least partially through the sleeve, radially out of the sleeve via the opening and into the enlarged chamber of the housing, and axially out of the housing via a lower bore of the housing.

7. The downhole valve of claim 1, wherein the sleeve comprises a shoulder and a cylindrical portion extending therefrom, wherein the cylindrical portion defines a central longitudinal axis, wherein the housing defines a central longitudinal axis, and wherein the central longitudinal axis of the cylindrical portion of the sleeve is generally parallel to but not collinear with the central longitudinal axis of the housing.

8. The downhole valve of claim 1, wherein the retaining element is at least partially axially aligned with the opening.

9. The downhole valve of claim 1, wherein the seat comprises a transition from a smaller diameter section of the sleeve to a larger diameter section of the sleeve, and wherein the first obstructing member has a diameter that is larger than a diameter of the smaller diameter section and smaller than a diameter of the larger diameter section.

10. The downhole valve of claim 1, wherein the first obstructing member comprises a spherical ball, and wherein the opening comprises a slot having a width that is less than a diameter of the first obstructing member.

11. The downhole valve of claim 1, wherein the sleeve is a first sleeve, the downhole valve further comprising:
a second sleeve that is axially offset from the first sleeve and defines a second valve seat and a second opening;
a second retaining member coupled to the second sleeve; and
a third obstructing member positioned in the second sleeve and prevented from exiting through the second opening and movable between the second valve seat and the second retaining member.

12. The downhole valve of claim 1, wherein the first obstructing member in the second position at least partially obstructs fluid flow through the second axial end of the sleeve and forces fluid to flow radially out of the sleeve.

13. The downhole valve of claim 1, wherein the first obstructing member is constrained from moving out of the sleeve.

14. The downhole valve of claim 1, wherein fluid is permitted to flow continuously in a downhole direction through the downhole valve while the first obstructing member is in the second position.

15. A method for operating a downhole valve, comprising:
positioning a first obstructing member in a sleeve that has a first axial end, a second axial end, a valve seat between the first and second axial ends, and an opening between the second axial end and the valve seat, the opening facing in a radial direction, wherein the first obstructing member is retained within the sleeve by the valve seat and a retaining member that is coupled to or integral with the sleeve and positioned proximal to the second axial end, and wherein the sleeve is positioned within a housing of the downhole valve, wherein the first obstructing member is movable in the sleeve between a first position and a second position, the first obstructing member in the first position engaging the valve seat and preventing fluid flow through the housing, and the first obstructing member in the second position being separated apart from the seat such that at least a portion of the opening is axially between the first obstructing member and the valve seat, such that fluid flow is permitted through the opening, wherein the first obstructing member moves axially, but is free from substantial radial movement, between the first and second positions;
deploying the downhole valve into a well, wherein the first obstructing member is configured to engage the valve seat to prevent fluid communication in an uphole direction, and wherein the first obstructing member is configured to move away from the valve seat to permit fluid communication in the downhole direction; and
deploying a second obstructing member into the well, wherein the second obstructing member proceeds into the sleeve, past the first obstructing member and through the opening, and to a downhole tool positioned subjacent to the downhole valve, to actuate the downhole tool.

16. The method of claim 15, wherein deploying the second obstructing member into the well comprises pumping fluid in a downhole direction through the downhole valve, and wherein pumping the fluid in the downhole direction through the downhole valve causes the first obstructing member to be separated apart from the seat.

17. The method of claim 16, wherein the sleeve prevents fluid flow in a radial direction away from the opening, so as to propel the second obstructing member radially outwards through the opening and through the downhole valve.

18. The method of claim 15, wherein the housing defines a throat that engages an outer surface of the sleeve proximal to a first axial end thereof, and an enlarged inner chamber in which the second axial end of the sleeve is positioned.

19. The method of claim 18, wherein the opening faces radially into the enlarged chamber, and wherein the second obstructing member passes axially by the first obstructing member in the enlarged chamber.

20. The method of claim 18, wherein the sleeve comprises a cylindrical portion that extends into the enlarged chamber, wherein the cylindrical portion defines a central longitudinal axis that is parallel to but not collinear with the central longitudinal axis of the cylindrical portion of the sleeve.

21. A downhole valve, comprising:
a housing;
a sleeve positioned within the housing, wherein the sleeve has a first axial end, a second axial end, and a seat positioned between the first axial end and the second axial end, wherein the sleeve defines a slot extending from the second axial end, and wherein the sleeve is continuous in a circumferential direction as proceeding from one side of the slot to an opposite side of the slot, such that the slot faces in a radial direction and the sleeve prevents fluid flow in an opposite radial direction away from the slot;
a retaining element coupled to the sleeve proximal to the second axial end;
a first obstructing member positioned in the sleeve and movable between the seat and the retaining element, wherein, in a first position, the first obstructing member engages the seat and prevents fluid flow between the slot and the seat in an uphole direction through the housing, and in a second position, the first obstructing member is separated apart from the seat such that at least a portion of the slot is axially between the first obstructing member and the seat, such that fluid flow is permitted in a downhole direction through the downhole valve via the slot, and wherein the first obstructing member is too large to fit through the slot, wherein the first obstructing member moves axially, but is free from substantial radial movement, between the first and second positions; and
a second obstructing member that is smaller than the first obstructing member, such that the second obstructing member is configured to move out of the sleeve via the slot when the first obstructing member is in the second position.

22. The downhole valve of claim 21, wherein the housing defines a throat that engages an outer surface of the sleeve, and an enlarged inner chamber in which the second axial end of the sleeve is positioned.

23. The downhole valve of claim 22, wherein the second obstructing member is configured to move axially into the sleeve from outside of the housing, axially through at least a portion of the sleeve, radially out of the sleeve via the slot and into the enlarged chamber of the housing, and axially out of the housing via a lower bore of the housing, wherein the second obstructing member is configured to move past the first obstructing member in the enlarged chamber, wherein the first and second obstructing members each are spherical balls, and wherein the second obstructing member is configured to actuate a subjacent downhole tool.

* * * * *